United States Patent [19]

Ogawa

[11] 4,364,583
[45] Dec. 21, 1982

[54] WEBBING GUIDE DEVICE

[75] Inventor: Hisashi Ogawa, Okazaki, Japan

[73] Assignee: Toyota Jidosha Kogyo Kabushiki Kaisha, Aichi, Japan

[21] Appl. No.: 207,889

[22] Filed: Nov. 18, 1980

[30] Foreign Application Priority Data

Feb. 18, 1980 [JP] Japan .............................. 55-19481[U]

[51] Int. Cl.³ ............................................. B60R 21/10
[52] U.S. Cl. .................................................. 280/802
[58] Field of Search .......................... 280/802, 803, 804

[56] References Cited

U.S. PATENT DOCUMENTS

| | | | |
|---|---|---|---|
| 4,084,841 | 4/1978 | Hayashi | 280/802 |
| 4,213,637 | 7/1980 | Mauron | 280/802 |
| 4,256,328 | 3/1981 | Thomas | 280/802 |

Primary Examiner—Robert R. Song
Attorney, Agent, or Firm—Stevens, Davis, Miller & Mosher

[57] ABSTRACT

A webbing guide device for use in a seatbelt system wherein one end of an occupant protecting webbing is engaged with a vehicle door and the other end thereof is engaged with the substantially central portion of a vehicle and, when the door is opened, the intermediate portion of the webbing is moved in the forward direction in the vehicle to form a space for an occupant to enter or leave the vehicle between a seat and itself. The intermediate portion of the webbing is guided by the forward end of an arm provided at the inboard side of the seat, and, when the occupant enters or leaves the vehicle, the arm is turned in the forward direction in the vehicle to bend the intermediate portion of the webbing so that the entering and leaving the vehicle by the occupant can be facilitated. Since the axis of a shaft supporting the arm is shifted to a certain extent from the lateral axial line of the vehicle, the arm does not interfere with a shift knob for the speed change when the arm is turned in the forward direction in the vehicle. Further, the arm is provided at the intermediate portion thereof with a bent portion, so that the arm does not interfere with the seat while being turned.

10 Claims, 6 Drawing Figures

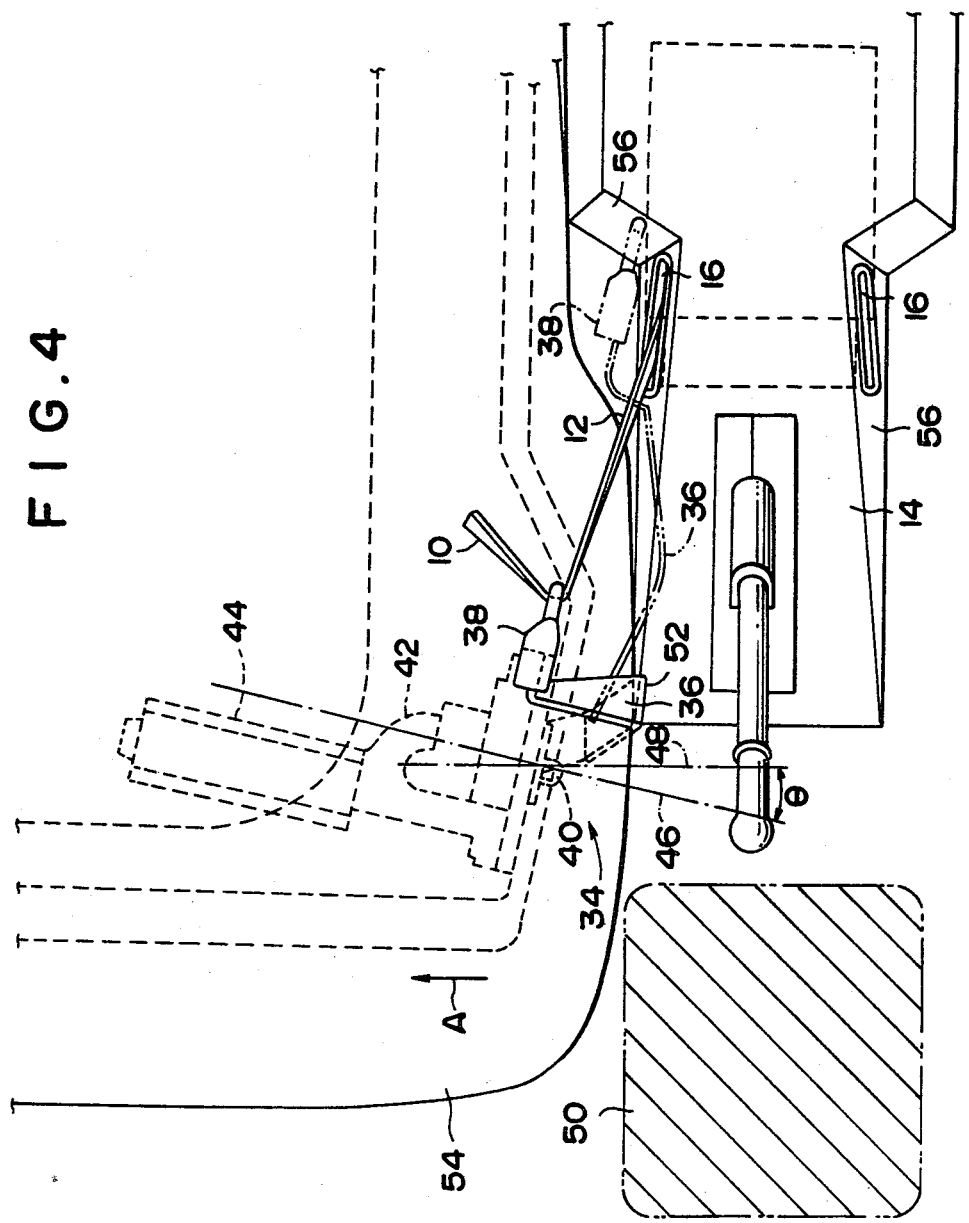

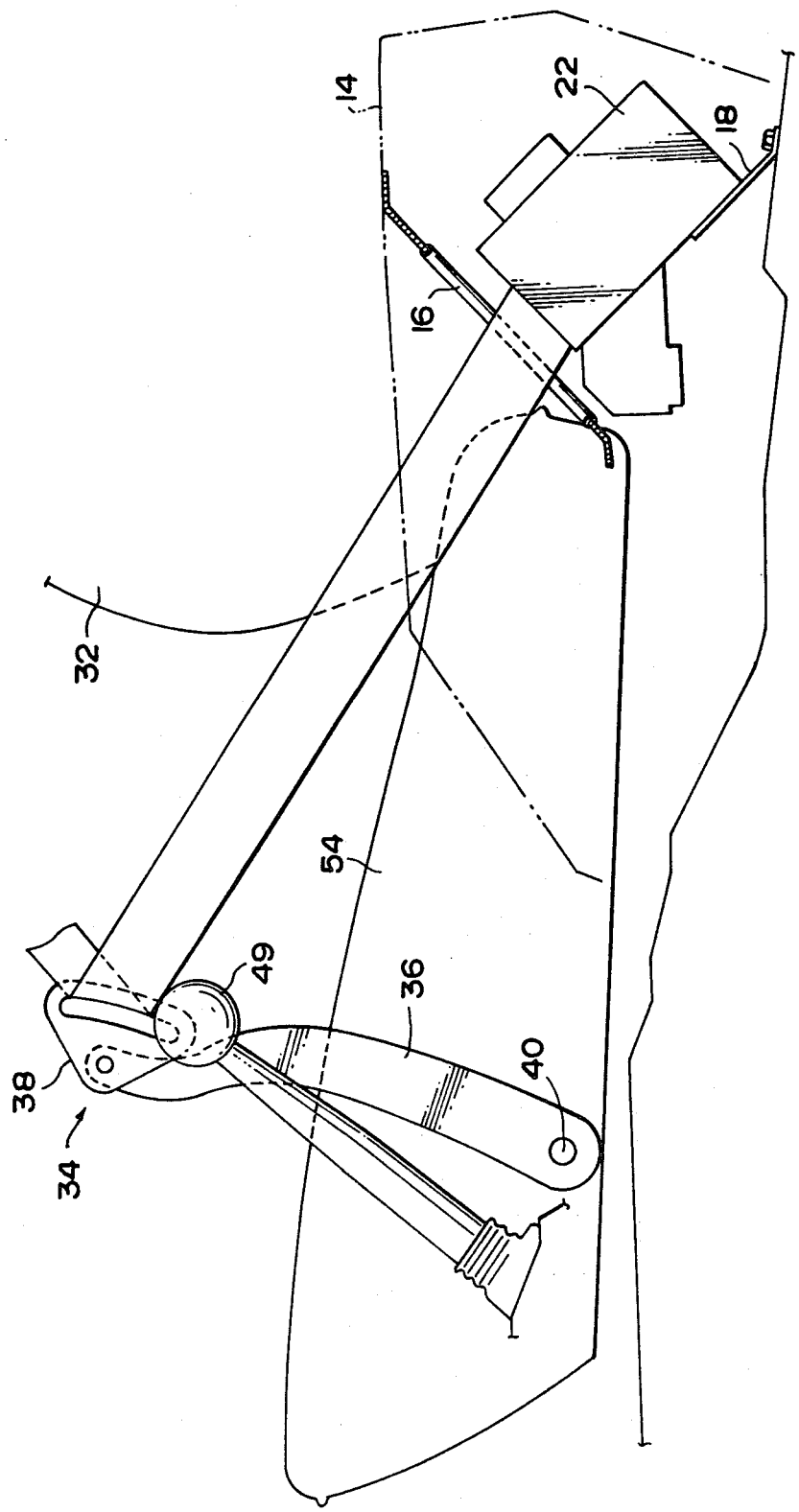

WEBBING GUIDE DEVICE

BACKGROUND OF THE INVENTION

1. Field of the Invention

The present invention relates to a webbing guide device for use in seatbelt systems for protecting an occupant of a vehicle, and more particularly to a webbing guide device for moving an intermediate portion of a webbing for use in an automatic fastening type seatbelt system.

2. Description of the Prior Art

There have been proposed so-called automatic fastening type seatbelt systems, in each of which an inner end of an occupant restraining webbing is engaged with the substantially central portion of the vehicle and an outer end thereof is engaged with a door of the vehicle, respectively, whereby the intermediate portion of the webbing is moved in the forward and rearward directions in the vehicle in accordance with the opening action of the door, so that the webbing can be automatically fastened to or unfastened from the occupant. In the seatbelt system as described above, it is preferable to provide a webbing guide device for moving the intermediate portion of the webbing forward to the vehicle during opening action of the vehicle door so as to further expand an interval between the webbing and an occupant seat.

The abovedescribed webbing guide device is of such an arrangement that the intermediate portion of the webbing is inserted through a guide ring provided at the forward end portion of an arm movable in the forward and rearward directions in the vehicle, whereby the arm is driven forward in the vehicle when door is opened.

However, the abovedescribed webbing guide device is mounted in a limited installation space among the occupant seat, a parking brake lever and a shift lever all of which are provided at substantially the central portion of the vehicle, thus preventing a disadvantage that the webbing guide device may contact a seat cushion of the occupant's seat and interfere with the moving path of the shift lever.

SUMMARY OF THE INVENTION

Therefore, the present invention has as its object the provision of a webbing guide device wherein an arm does not interfere with components in a compartment of a vehicle such as an occupant's seat, a shift lever and the like while turning.

In the webbing guide device according to the present invention, special consideration is given in avoiding the interference of the arm with the components in the compartment of the vehicle by shifting the turning axis of the arm from the lateral axial line of the vehicle through a predetermined angle to deviate the engaging portion of the webbing laterally, outwardly from the vehicle body at the forwardly turned position of the arm.

Description will hereunder be given of an embodiment of the present invention with reference to the drawings.

BRIEF DESCRIPTION OF THE DRAWINGS

FIG. 4 is a plan view of FIG. 2 showing the state where the arm is turned forward in the vehicle;

FIG. 5 is a front view showing the state where the seat is moved to the foremost position of the vehicle from the condition shown in FIG. 2.

DESCRIPTION OF THE PREFERRED EMBODIMENT

Figure 1:
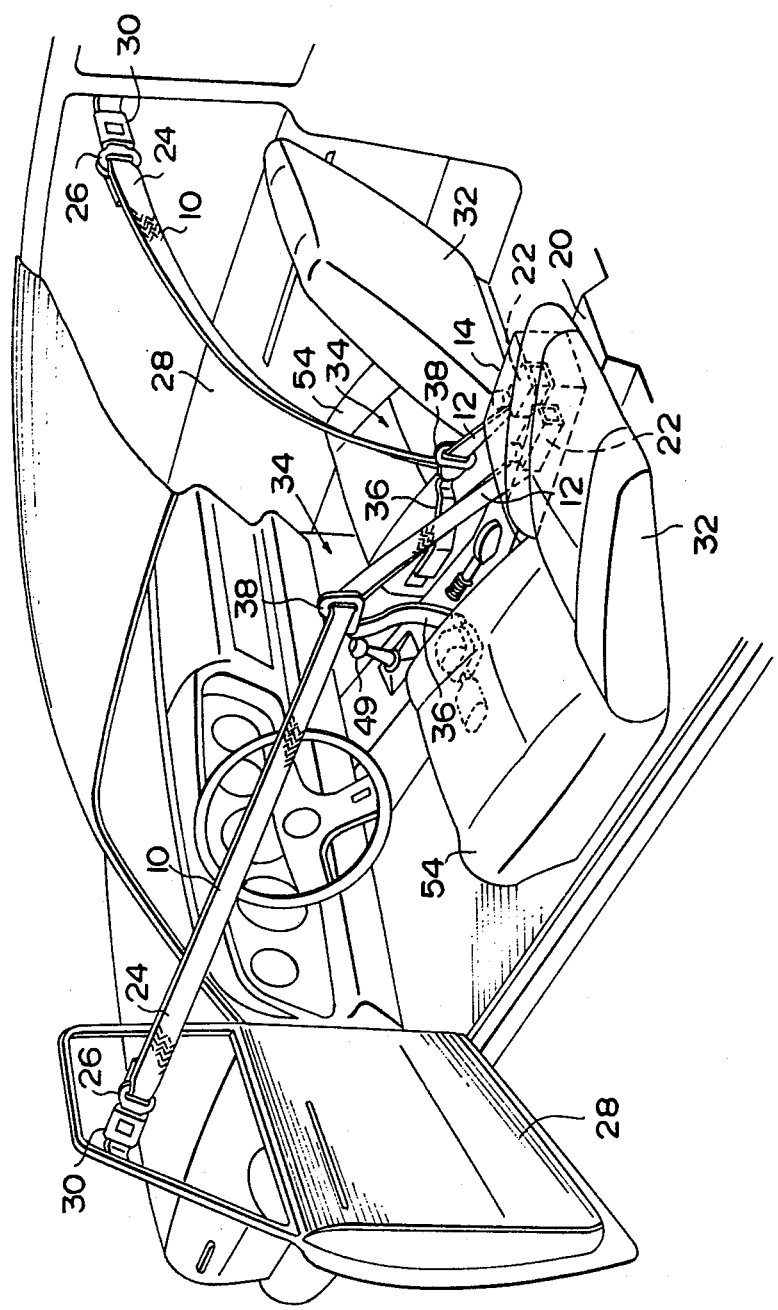
FIG. 1 is a perspective view showing an embodiment of the webbing guide device according to the present invention.
Figure 2:
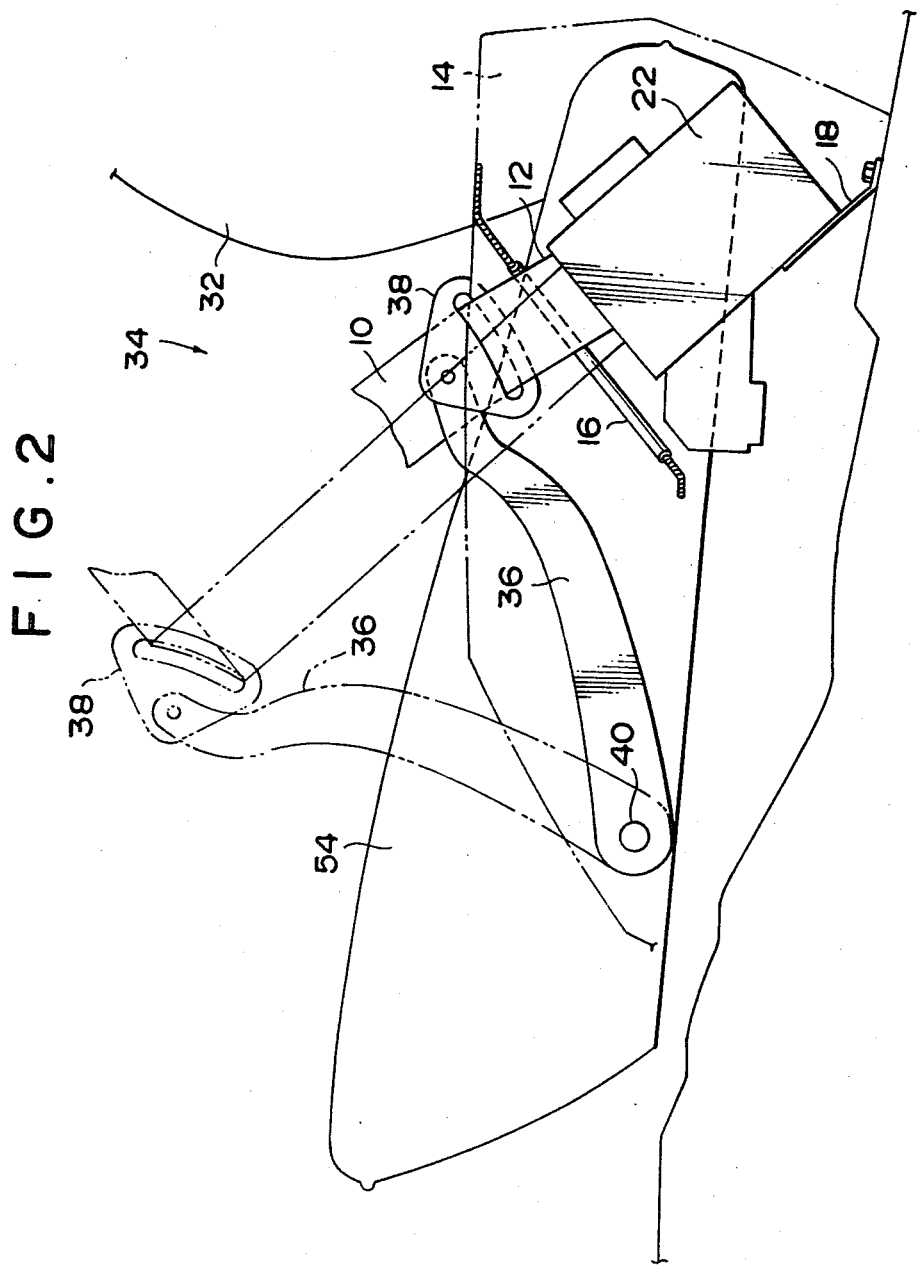
FIG. 2 is a front view showing the webbing guide device as viewed in the lateral direction of the vehicle when the occupant's seat is at the hindmost position of the vehicle.

As shown in FIGS. 1 and 2, an inner end 12 of an occupant restraining webbing 10 is introduced into a console box 14 through an opening 16 of the console box 14 to be disposed therein and wound up into a retractor 22 solidly secured to a tunnel portion 20 formed at the substantially central portion of the vehicle through a bracket 18. The retractor 22 winds the webbing 10 up by its bias and incorporates therein an inertia locking mechanism for suddenly stopping the windout of the webbing 10 in an emergency of the vehicle.

On the other hand, engaged with an outer end 24 of the webbing 10 is a tongue plate 26 which is engaged with a buckle device 30 for emergency releasing that is solidly secured to the upper portion of the vehicle door 28, so that the outer end 24 can be engaged with the door 28. With the arrangement as described above, if the door is opened, then, as shown in a driver's seat in FIG. 1, the inner end of the webbing 10 is wound out of the retractor 22 and moved forward in the vehicle, so that a space for the occupant to enter the vehicle can be formed between a seat 32 and the webbing 10.

The webbing guide devices 34 are provided at the inboard sides of the seat 32, respectively. In the webbing guide device 34, a guide ring 38 for engaging the webbing 10 is provided at the forward end of an arm 36, which can turn about a horizontal shaft 40 in the forward and rearward directions in the vehicle. As shown in FIG. 1, when the door 28 is opened, this arm 36 turns in the forward direction in the vehicle, whereby the guide ring 38 further moves the intermediate portion of the webbing 10 to a position forwardly of the seat 32, thereby facilitating the entering or leaving of the vehicle by the occupant, and, when the door 28 is closed, as shown in the passenger seat in FIG. 1, the arm 36 turns in the rearward direction in the vehicle, so that the webbing 10 can be fastened to the occupant.

Figure 3:
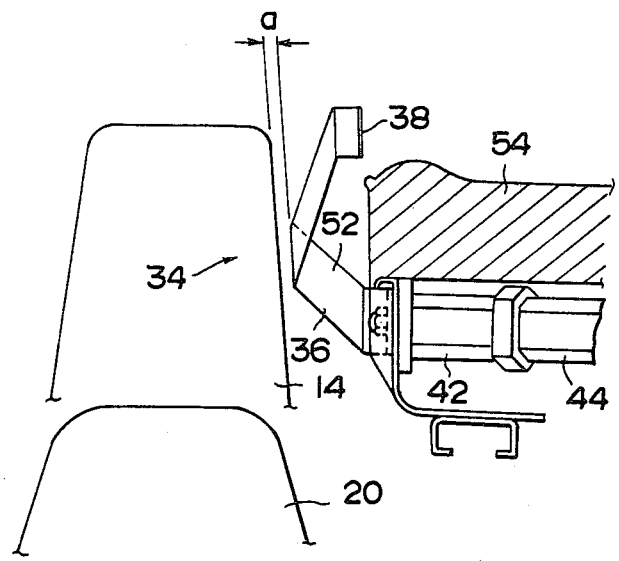
FIG. 3 is a left side view of FIG. 2.

Here, as shown in FIGS. 3 and 4, the horizontal shaft 40 passes through a speed reduction box 42 assembled into a seat 32 and receives a driving force of a motor 44. The motor 44 is adapted to detect the state of the occupant being seated in the vehicle, to thereby turn the arm 36. More specifically, when the door 28 is opened, the arm 36 is turned to the substantially vertical position indicated by two-dot chain lines in FIG. 2 and by solid lines in FIG. 5 in the forward direction in the vehicle, and, when the door 28 is closed, the arm 36 is turned in the rearward direction in the vehicle.

As shown in FIG. 4, the axis of a horizontal shaft 40 is shifted through an angle $\theta$ with respect to a line 48 being in parallel to the lateral axial line of the vehicle in such a manner that, when the arm 36 is turned in the forward direction in the vehicle (as shown in FIG. 5), the guide ring 38 is disposed more outboardly in the vehicle (in a direction indicated by an arrow A in FIG.

4) than the position of the guide ring 38 when the arm 36 is turned in the rearward direction in the vehicle (as shown in FIG. 2).

Figure 6:
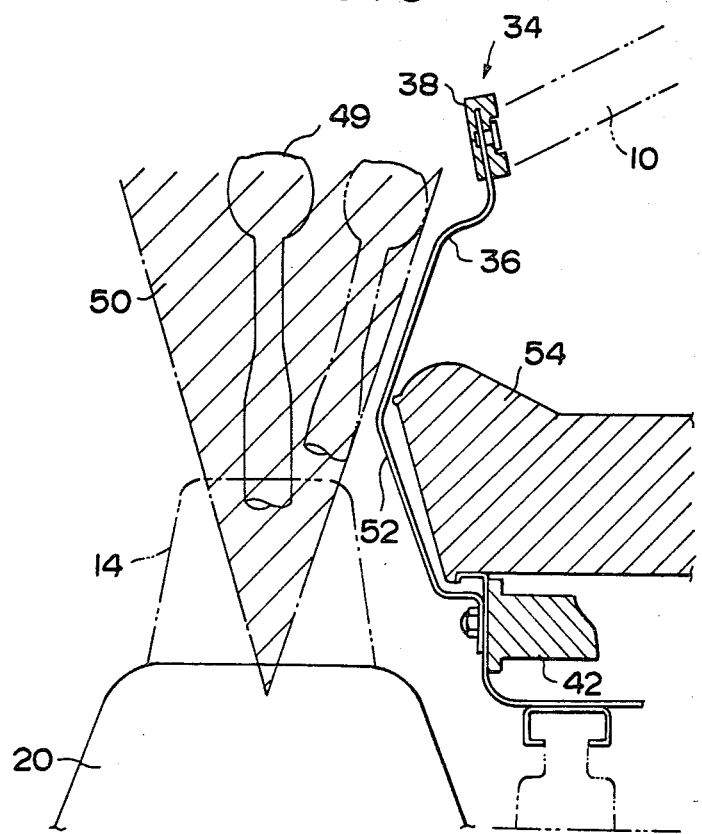
FIG. 6 is a right side view of FIG. 5.

Consequently, when the arm 36 is turned in the forward direction in the vehicle, the arm 36 and guide ring 38 do not interfere with the moving path of a shift knob 49 constituting a shift lever as shown in FIG. 6.

As shown in FIG. 6, the arm 36 is provided at the intermediate portion thereof with a letter "J" shaped bent portion 52 as viewed from the rear of the vehicle, thereby allowing the arm 36 to avoid abutting against a seat cushion 54. More particularly, a portion of the arm 36 secured to the horizontal shaft and the guide ring 38 are disposed downwardly and upwardly of the seat cushion 54, respectively, the bent portion 52 formed at the intermediate portion of the arm 36 stretches out toward the shift knob disposed on the longitudinal axial line of the vehicle, whereby the arm 36 does not interfere with the seat cushion 54 when turned.

In addition, as shown in FIG. 4, the console box 14 is provided at opposite sides thereof with recesses 56, whereby, in the case the seat 32 is in its rearmost position, even if the arm 36 turns in the rearward direction in the vehicle, there is no possibility of the guide ring 38 abutting against the console box 14.

Description will hereunder be given of this embodiment with the above-described arrangement. When the occupant opens the door 28 for entering the vehicle, the webbing 10 is moved in the forward direction in the vehicle in accordance with a circularly arcuate motion of the door 28 as shown in the driver's seat in FIG. 1, whereby the inner end 12 of the webbing 10 is wound out of the retractor 22, so that the intermediate portion of the webbing 10 is separated from the seat 32. Further, through the opening action of the door 28, the motor 44 turns the arm 36 in the forward direction in the vehicle, whereby the guide ring 38 bends the intermediate portion of the webbing 10 in the forward direction in the vehicle, whereby the interval between the webbing 10 and the seat 32 is increased. In this case, the horizontal shaft 40 of the arm 36 is shifted from the lateral axial line of the vehicle through the angle θ and the intermediate portion of the arm 36 is bent, whereby, even if the arm 36 is turned in the forward direction in the vehicle, the arm 36 and guide ring 38 do not interfere with the shift knob 49 and seat cushion 54. This is true of the case in which the seat 32 is moved from the rearmost position shown in FIGS. 2 through 4 to the foremost position shown in FIG. 5, and no interference occurs irrespective of what the position of the seat 32 is.

When the the occupant closes the door 28 upon being seated, the outer end 24 of the webbing 10 is moved in the rearward direction in the vehicle in accordance with a circularly arcuate closing motion of the door, and, as the motor 44 is rotated in the reverse direction, the arm 36 is turned in the rearward direction in the vehicle, whereby the guide ring 38 causes the intermediate portion of the webbing 10 to approach the seat 32. By this action, the webbing 10 is automatically fastened to the seated occupant.

In this case also, the arm 36 and guide ring 38 do not interfere with the shift knob 49 and seat cushion 54.

Additionally, the abovedescribed action would be reversed when the occupant leaves the vehicle, and, likewise the arm 36 and guide ring 38 do not interfere with the components in the compartment of the vehicle.

In an emergency of the vehicle such as a collision, the inertia lock mechanism in the retractor 22 suddenly prevents the webbing 10 from being wound out, whereby the occupant is reliably restrained by the webbing 10, thereby enabling the safety of the occupant to be ensured. Furthermore, upon completion of the collision, if the tongue plate 26 is released from the buckle device 30, then the webbing 10 can be unfastened from the occupant to permit the occupant to escape from the vehicle.

As has been described hereinabove, the webbing guide device according to the present invention is of such an arrangement that the horizontal shaft for turning the arm is shifted through a predetermined angle from the lateral axial line of the vehicle and the arm is formed at the intermediate portion thereof with the bent portion, thereby offering such an outstanding advantage that the arm and the webbing engaging portion do not interfere with the components in the compartment of the vehicle.

What is claimed is:

1. A webbing device for use in a seatbelt system for automatically fastening a webbing to protect an occupant in an emergency of a vehicle to the occupant after his entering the vehicle, wherein the intermediate portion of the webbing is moved forward in the vehicle when the occupant enters or leaves the vehicle, comprising:
    (a) a shaft supported on an occupant's seat, the axis of which is held substantially horizontally and shifted through a predetermined angle from the lateral axial line of the vehicle;
    (b) an arm rotatably secured near one end thereof to said shaft, disposed at the inboard side of said seat and rotatable in the forward and rearward directions in the vehicle, said arm being provided at an intermediate portion thereof with a bent portion for preventing said arm from interfering with said seat when said arm is rotated in the forward and rearward directions in the vehicle;
    (c) a guide ring provided at the other end of said arm for longitudinally movably supporting the intermediate portion of said webbing, said guide ring being disposed more outboardly in the vehicle when it is moved along with the rotation of the arm in the forward direction in the vehicle than when the arm is rotated in the rearward direction in the vehicle due to the presence of said shaft being shifted from the lateral axial line of the vehicle, whereby said guide ring is prevented from interfering with a shift knob; and
    (d) a motor connected to said shaft for rotating said arm forward in the vehicle, when the occupant enters or leaves the vehicle, to bend the intermediate portion of the webbing forward in the vehicle, thereby enlarging a space for the occupant to enter or leave the vehicle.

2. A webbing guide device as set forth in claim 1, wherein an inner end of said webbing is wound into a retractor provided at the central portion of the vehicle and said retractor can suddenly prevent the webbing from being wound out in an emergency of the vehicle.

3. A webbing guide device as set forth in claim 2, wherein said retractor is housed in a console box provided at the substantially central portion of the vehicle.

4. A webbing guide device as set forth in claim 3, wherein recesses are formed at opposite side surfaces of said console box, whereby said console box is prevented from interfering with the guide ring when said arm is turned rearward in the vehicle.

5. A webbing guide device as set forth in claim 1, wherein an outer end of said webbing is engaged through a tongue plate and a buckle device with the vehicle door, said buckle device being capable of disengaging the tongue plate to unfasten the webbing from the occupant on demand.

6. A webbing guide device as set forth in claim 5, wherein said buckle device is secured to the upper portion of the door, whereby the webbing is obliquely fastened to the upper body of the occupant.

7. A webbing guide device as set forth in claim 1, wherein said guide ring is turnably secured to the forward end of said arm.

8. A webbing guide device as set forth in claim 1, wherein said bent portion is formed into a letter "J" shape as viewed from behind.

9. A webbing guide device as set forth in claim 1, wherein said motor is secured to the lower portion of a seat.

10. A webbing guide device for use in a seatbelt system for winding one end of an occupant protecting webbing into a retractor provided at the substantially central portion of a vehicle and engaging the other end thereof with a vehicle door so as to form a space for an occupant to enter or leave the vehicle when the door is opened, wherein an arm is provided inboard of a seat and a guide ring for holding the intermediate portion of the webbing is provided at one end of said arm, said arm being rotatable forward in the vehicle when the occupant enters or leaves the vehicle, characterized in that the axis of a horizontal shaft for supporting said arm is shifted through a predetermined angle from the lateral axial line of the vehicle, whereby said guide ring is disposed more outboardly in the vehicle when the arm is rotated forward in the vehicle than when the arm is rotated rearward in the vehicle, so that the arm can be prevented from interfering with a shift knob when the arm is rotated forward in the vehicle, and said arm is provided at the intermediate portion thereof with a bent portion being of a letter "J" shape as viewed from behind for avoiding interference with a seat cushion.

* * * * *